US005975390A

United States Patent [19]

Saroli

[11] Patent Number: 5,975,390

[45] Date of Patent: Nov. 2, 1999

[54] PROMOTIONAL GOLF CART CUSHION

[75] Inventor: David Saroli, 490 Granger Rd., Ortonville, Mich. 48462

[73] Assignee: David Saroli, Ortonville, Mich.

[21] Appl. No.: 09/065,639

[22] Filed: Apr. 23, 1998

[51] Int. Cl.[6] .......... B60R 9/00

[52] U.S. Cl. .......... 224/274; 224/484; 297/219.1; 297/227

[58] Field of Search .......... 224/274, 223, 224/675, 677, 270, 409, 411, 484; 206/315.3, 315.5; 280/DIG. 5, DIG. 6, 33.992; 180/89.11; 383/38, 39, 40; 211/86.01; 5/100; 297/219.1, 223, 225, 227, 228, 228.12, 229

[56] References Cited

U.S. PATENT DOCUMENTS

| | | | |
|---|---|---|---|
| 4,512,504 | 4/1985 | Owlett | 224/572 |
| 4,805,937 | 2/1989 | Boucher et al. | 280/33.992 |
| 5,031,713 | 7/1991 | Criscuolo | 180/89.1 |
| 5,269,410 | 12/1993 | Abregano | 206/315.5 |
| 5,370,246 | 12/1994 | Traynor | 211/86.01 |
| 5,557,817 | 9/1996 | Haddock | 5/663 |
| 5,700,053 | 12/1997 | Downing | 297/227 |
| 5,855,412 | 1/1999 | Smith et al. | 297/256.17 |

*Primary Examiner*—Allan N. Shoap
*Assistant Examiner*—Maerena W. Brevard
*Attorney, Agent, or Firm*—Harness, Dickey & Pierce, P.L.C.

[57] ABSTRACT

This invention is directed to a removable golf cart cushion for placement on a side rail of a golf cart to provide both protection from the side rail, space for advertisement, and convenient holders for various golf accessories. The golf cart cushion includes a fastener, such as a hook and loop fastener, formed on opposite edges of the removable cushion. The cushion is folded over the side rail, and the hook and loop fasteners on the opposite edges engage to maintain the cushion in place.

10 Claims, 3 Drawing Sheets

Fig-1
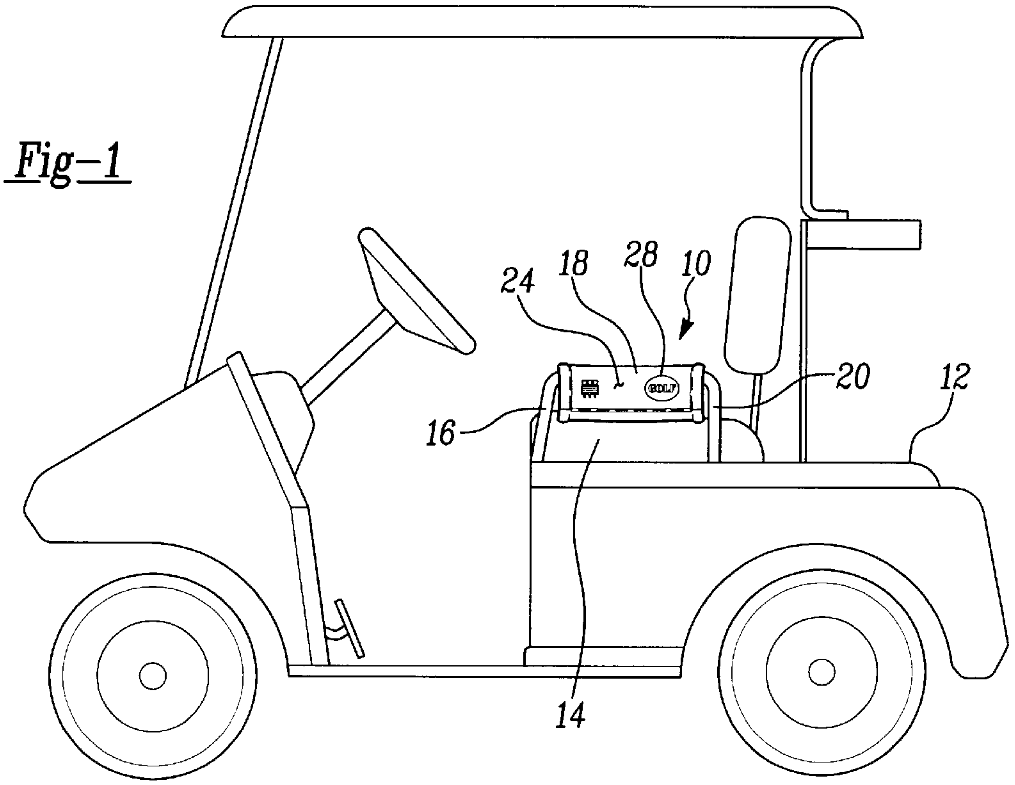
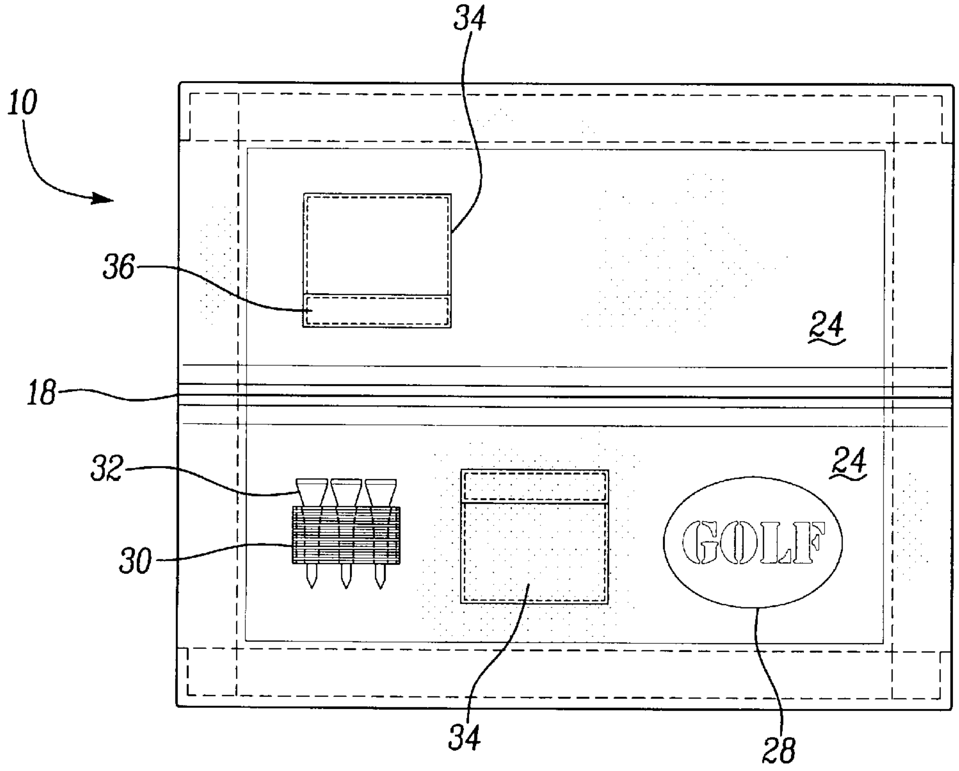
Fig-2

PROMOTIONAL GOLF CART CUSHION

BACKGROUND OF THE INVENTION

1. Field of the Invention

The present invention relates generally to a promotional golf cart cushion, and more particularly, a promotional golf cart cushion which may be attached to the side rail of a golf cart, which enables advertising information to be inscribed thereon and which provides a convenient holder for various golf accessories.

2. Discussion

The sport of golf has become increasingly popular in the last few years. Many new players have been drawn to the sport and many long-time players are experiencing a renewed devotion to the sport. The increasing popularity of golf has resulted in an increase in fund raising events which involve golf, referred to as a golf outing. Many golf outings are specifically designed to raise money for various causes such as charities, children's funds, health foundations, and the like. The underlying theme of the golf outings is to provide an enjoyable day while raising money for a good cause. In addition to golf outings, public courses are experiencing unprecedented usage resulting in handsome profit margins.

In almost any golf-related situation directed towards raising money, one particularly effective approach to generating revenues is providing advertising space to various sponsors or advertisers. Advertisers take advantage of available advertising space on shirts, hats, gloves, bags, and the like. Until now, advertisements posted on golf carts has been generally limited, presumably because golf proprietors do not want to turn a golf cart into a vehicle full of various advertising slogans and logos. In addition, considering the extensive usage that golf carts undergo during a season, any such advertisement may be less than permanent and would eventually peel or fall off the golf cart leaving the golf cart looking unsightly and littering the course with advertisements.

Further, as is well know in the art, most golf carts include a bench seat which is bounded on the outboard ends by side rails to prevent passengers from sliding off the seat while riding in the golf cart. Golf cart side rails comprise an unprotected, metal, tubular structure without any padding. When the passengers slide towards the side rail, the passenger's hip may strike the side rail causing discomfort. Further, golf cart riders sometimes bump the side rail with their legs or hands when entering or exiting the cart.

Thus, it is an object of the present invention to provide a cushion which may be fixed to the side rail of a golf cart in order to provide removable padding to the side rail.

It is yet a further object of the present invention to provide a removable cushion which may be attached to the side rail of a golf cart to provide protection from contact with the side rail and to provide a space for advertisement information and for compartments for storing various golf accessories.

SUMMARY OF THE INVENTION

A removable golf cart cushion for placement on a side rail of a golf cart to provide both protection from the side rail, space for advertisement, and convenient holders for various golf accessories. The golf cart cushion includes a fastener, such as a hook and loop fastener, formed on opposite edges of the removable cushion. The cushion is folded over the side rail, and the hook and loop fasteners on the opposite edges engage to maintain the cushion in place.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views:

FIG. 1 is a side view of a golf cart and a removable cushion attached to the side rail of the golf cart in accordance with the principals of the present invention;

FIG. 2 is a top view of the removable cushion showing the visible surface of the removable cushion;

DETAILED DESCRIPTION OF THE INVENTION

Figure 3:
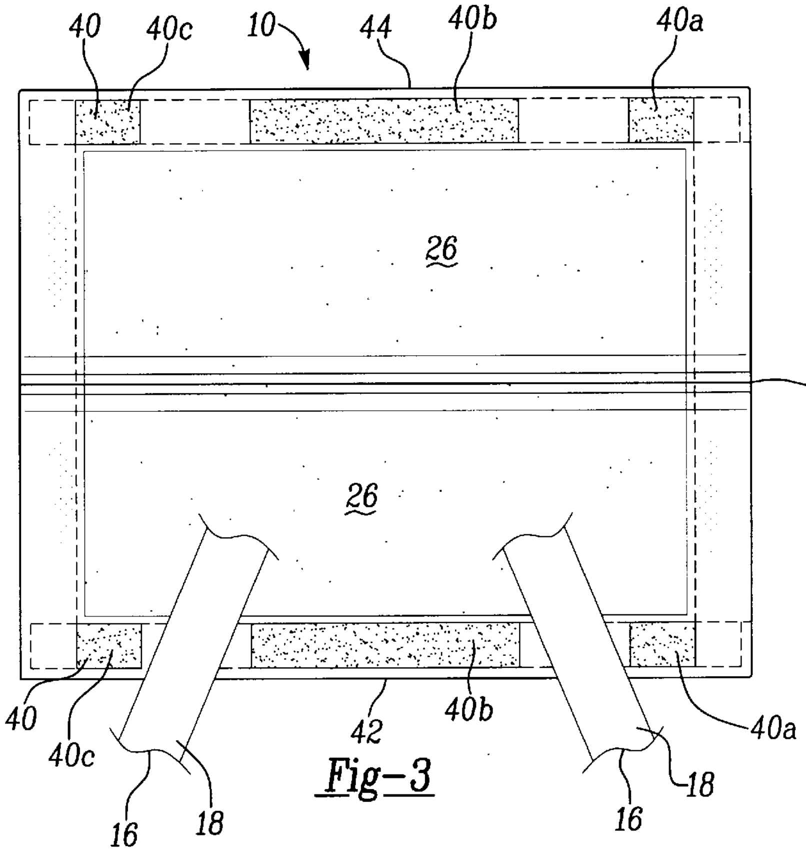
FIG. 3 is a top view of the removable cushion showing the hidden surface of the removable cushion and also shows one arrangement for attachment of the cushion to the side rail.
Figure 4:
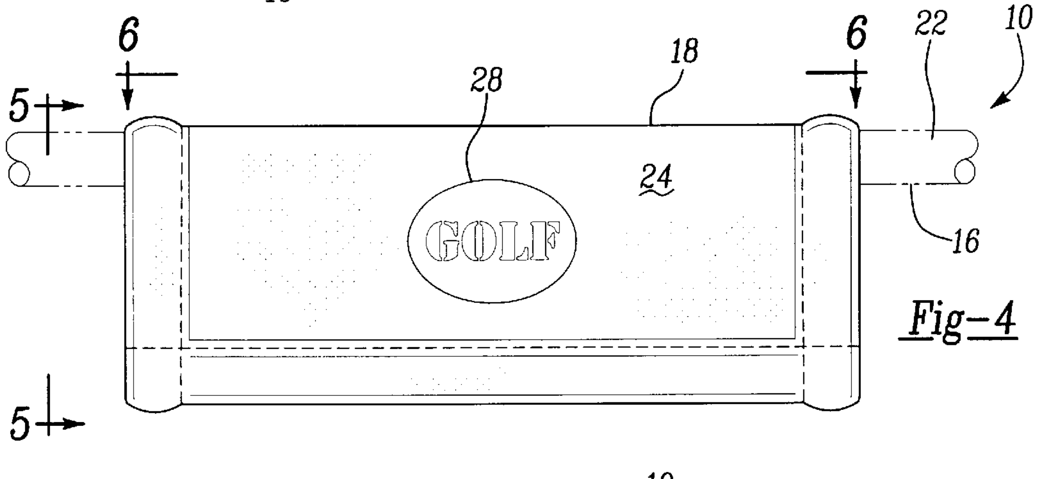
FIG. 4 is a side view of the removable cushion shown attached to the side rail.
Figure 5:
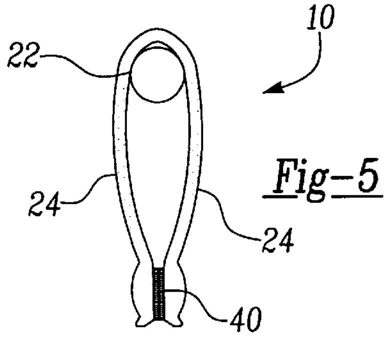
FIG. 5 is a side view of the side rail and removable cushion taken along the lines 5—5 of FIG. 4.
Figure 6:
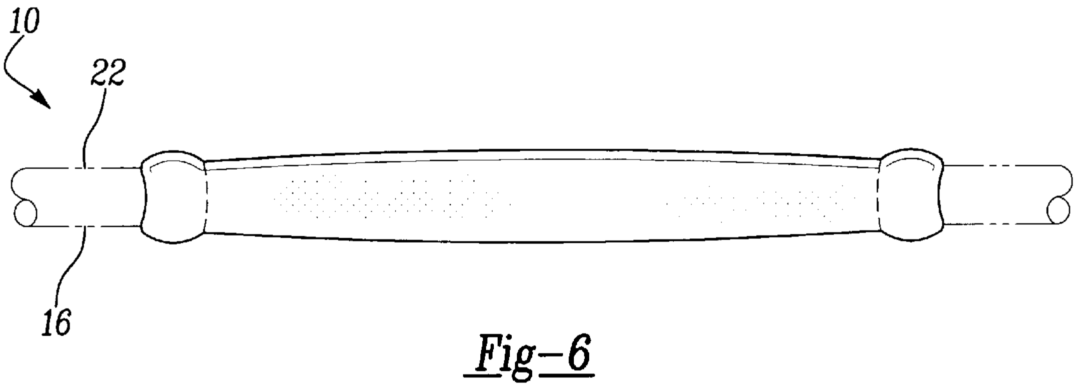
FIG. 6 is a top view of a side rail and an attached removable cushion taken along line 6—6.

Referring to FIGS. 1–6, the removable golf cart cushion 10 is shown attached to a golf cart 12 having a bench seat 14 which is bounded on its outboard sides by a side rail 16. Golf cart cushion 10 is formed in a general horizontally rectangle having a fold 18 so that the golf cart cushion 10 can be formed around side rail 16. Side rail 16 includes a vertical section 20 and a horizontal section 22.

Cushion 10 includes a visible surface 24 and a hidden surface 26. Visible surface 24 corresponds to outer surfaces of cushion 10 when cushion 10 is fixed to side rail 16. Hidden surface 26 corresponds to the inner surfaces of cushion 10 when cushion 10 is fixed to side rail 16. Visible surface 24 may include an area 28 to accommodate various advertising information which a sponsor or advertiser may choose to have printed on the cushion 10 prior to distribution, such as at a golf outing or public golf course. Visible surface 24 may also include a holder 30 for tees 32. Holder 30 may be formed of elastic material which may be stitched to visible surface 24 of cushion 10 visible surface 24 of cushion 10 may also include a compartment or pocket 34, which may be formed by stitching material to visible surface 24 of cushion 10, to hold keys, rings, tees, ball markers, divot repair tools, and the like. Pocket 34 may include a closure 36, which may be implemented using a hook and loop fastener arrangement.

Cushion 10 may be fastened to side rail 16 by placing fasteners 40 on opposite edges 42 and 44, respectively, of cushion 10. Fasteners 40 may be implemented using hook and loop fasteners, as are well known in the art. Fasteners 40 may comprise a continuous strip traversing each opposing edge 42 and 44. Alternatively, fastener 40 may be comprised of discontinuous sections **40*a*, 40*b*, and 40*c*, as shown in FIG. 3. A vertical section 20 of side rail 16 may be disposed between two of the discontinuous sections 40***a*, 40*b*, and 40*c* to accommodate side rails 16 having narrowly spaced vertical sections 20.

Figure 7:
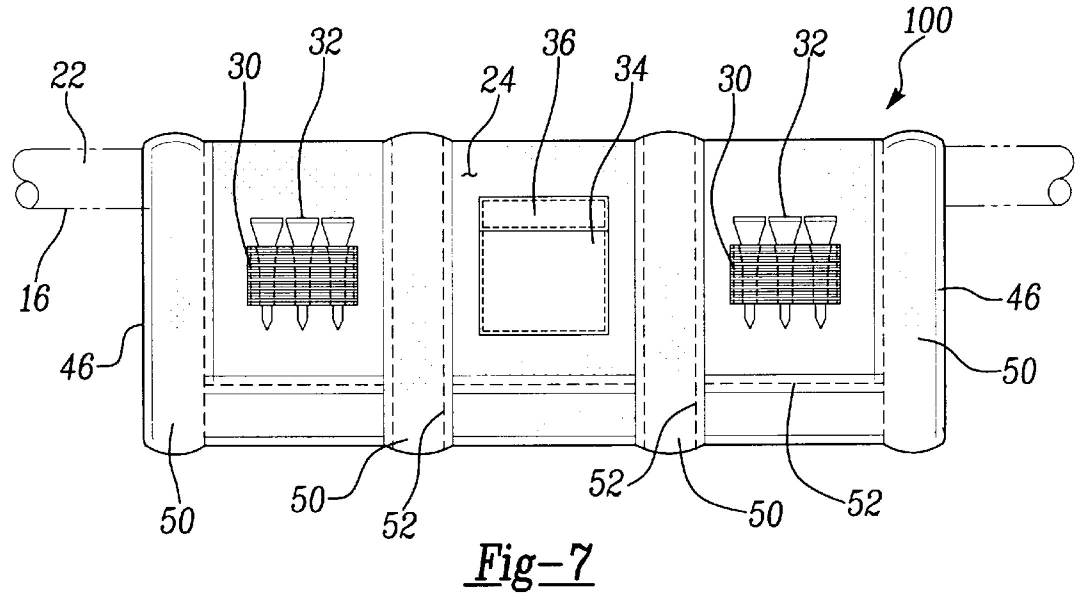
FIG. 7 is an elevational view of a removable cushion arranged in accordance with the principals of a second embodiment of the present invention.
Figure 8:
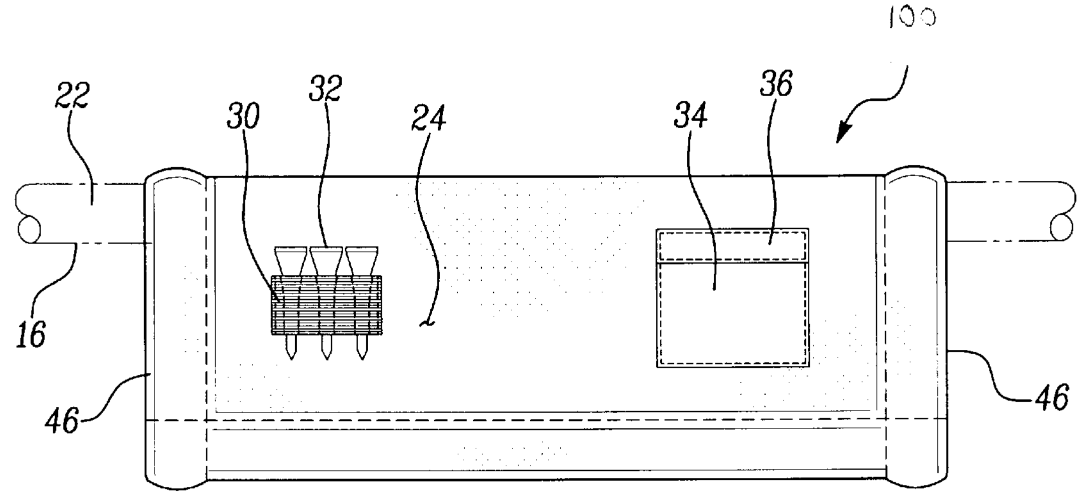
FIG. 8 is an elevational view of a variation of the second embodiment shown in FIG. 7.

FIGS. 7 and 8 depict a second embodiment of removable cushion 100. Note that similar elements from FIGS. 1–6 will be referred to in FIGS. 7 and 8 using like reference numerals. Removable cushion 100 is substantially as described above but includes a pair of tee holders 30 formed of elastic material, as described above, to hold tees 32. Tee holders 30 are spaced towards opposing vertical edges 46. A pocket or compartment 34 is placed between tee holders 32. FIG. 8 is a variation of the embodiment of FIG. 7 in which a tee holder 30 and pocket 34 are spaced towards vertical opposing edges 46.

With respect to placement of advertisement 28, tee holders 30, and pocket or compartment 34, one skilled in the art will recognize that one or a number of these individual elements may be placed preferably on visible surface 24 of removable cushion 10 or 100. Further, one skilled in the art will recognize that one or a number of each of such advertisement 28, tee holder 30, and pocket or compartment 34 may be formed on cushion 10 or 100 in a variety of positions. One skilled in the art will further recognize that any of the above-discussed items may be placed toward an inboard or outboard side of side rail 16. FIG. 7 also depicts various piping 50 and stitching 52 shown on cushion 110. Applicant respectfully submits that the piping 50 and the stitching 52 shown herein is purely ornamental.

In view of the foregoing, one can recognize that the present invention provides a convenient place for advertisement on a golf cart and also provides a useful side rail cushion for holding various golf accessories. Further, one skilled in the art will recognize that the golf cart cushion 10 described herein can be easily removed from the side rail. Further, when removed, the cushion 10 may be laid flat and placed on a wet surface so that the golfer may have a dry place to sit.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. A removable cushion in combination with a golf cart comprising:

the golf cart having a seat and a side rail for the seat;

the removable cushion for temporary attachment to the side rail; and a fastener provided on the removable cushion for attaching the removable cushion to the side rail, the cushion having visible surfaces and hidden surfaces when attached to the side rail;

wherein the visible surfaces correspond to the outer surfaces of the cushion and the hidden surfaces correspond to the inner surfaces of the cushion when the cushion is fixed to the side rail by said fastener, said cushion having a length and having a center fold dividing said cushion into two equal sides of said same length, said center fold resting on said side rail, and said cushion including an article holder located on one of said visible surfaces.

2. The apparatus of claim 1 wherein the fastener comprises a hook and loop fastener.

3. The apparatus of claim 2 wherein the hook and loop fastener is disposed on opposite edges of the cushion so that the cushion may be folded around the side rail so that the hook and loop fasteners disposed on the opposite edges cooperate to attach the opposite edges.

4. The apparatus of claim 1 wherein the cushion includes a section on one of the visible surfaces for placing advertisements.

5. The apparatus of claim 1 wherein the cushion includes a tee holder arranged on one of the visible surfaces.

6. The apparatus of claim 1 wherein the tee holder includes a strip of resilient material for receiving the tees.

7. The apparatus of claim 1 wherein the cushion includes a pocket arranged on one of the visible surfaces.

8. The apparatus of claim 7 wherein the pocket may be sealed to maintain contents therein.

9. The apparatus of claim 7 wherein the cushion includes a tee holder arranged on one of the visible surfaces.

10. The apparatus of claim 9 wherein the tee holder includes a strip of resilient material for receiving the tees.

* * * * *